US009868480B1

(12) United States Patent
Renke et al.

(10) Patent No.: US 9,868,480 B1
(45) Date of Patent: Jan. 16, 2018

(54) INTEGRATED VEHICLE BODY WEIGHT(S)

(71) Applicant: GM GLOBAL TECHNOLOGY OPERATIONS LLC, Detroit, MI (US)

(72) Inventors: David T. Renke, Macomb, MI (US); Michael A. Faucett, Jr., Madison Heights, MI (US); Joseph M. Polewarczyk, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/212,922

(22) Filed: Jul. 18, 2016

(51) Int. Cl.
*B62D 33/023* (2006.01)
*B60R 11/00* (2006.01)
*B62D 49/06* (2006.01)
*B62D 63/04* (2006.01)

(52) U.S. Cl.
CPC .......... *B62D 49/0628* (2013.01); *B60R 11/00* (2013.01); *B62D 33/023* (2013.01); *B62D 63/04* (2013.01); *B60R 2011/004* (2013.01); *B60R 2011/0052* (2013.01)

(58) Field of Classification Search
CPC .. B62D 49/0628; B62D 33/023; B62D 63/04; B60R 11/00; B60R 2011/004; B60R 2011/0052
See application file for complete search history.

(56) References Cited

U.S. PATENT DOCUMENTS

| 3,727,971 | A | * | 4/1973 | Sisler | B60K 15/073 224/404 |
|---|---|---|---|---|---|
| 4,339,142 | A | * | 7/1982 | Tanner | B62D 49/085 16/404 |
| 5,494,315 | A | * | 2/1996 | Heltenburg | B62D 37/04 280/759 |
| 5,941,565 | A | * | 8/1999 | Clendenin, Jr. | B60R 11/00 224/403 |
| 6,079,741 | A | * | 6/2000 | Maver | B60R 9/00 224/404 |
| 6,302,464 | B1 | * | 10/2001 | Kubis | B60R 9/00 280/759 |
| 2007/0284865 | A1 | * | 12/2007 | Watkins | B62D 33/0273 280/759 |
| 2008/0197614 | A1 | * | 8/2008 | Connors | B60P 3/2205 280/759 |
| 2008/0309059 | A1 | * | 12/2008 | Clements | B62D 49/0628 280/759 |

* cited by examiner

*Primary Examiner* — Drew J Brown
(74) *Attorney, Agent, or Firm* — Quinn IP Law

(57) ABSTRACT

A vehicle having a power-source configured to propel the vehicle via power-source torque, a driven wheel configured to receive the power-source torque, and a vehicle body structure. The vehicle body structure includes a wheelhouse configured to extend over the driven wheel and also defines a locating feature. The vehicle further includes an integrated weight element configured to engage the locating feature and a fastener configured to fix the integrated weight element to the vehicle body structure either proximate to or directly to the wheelhouse. The vehicle can be configured as a truck, wherein the vehicle body structure includes a truck bed incorporating the wheelhouse and the integrated weight element.

17 Claims, 3 Drawing Sheets

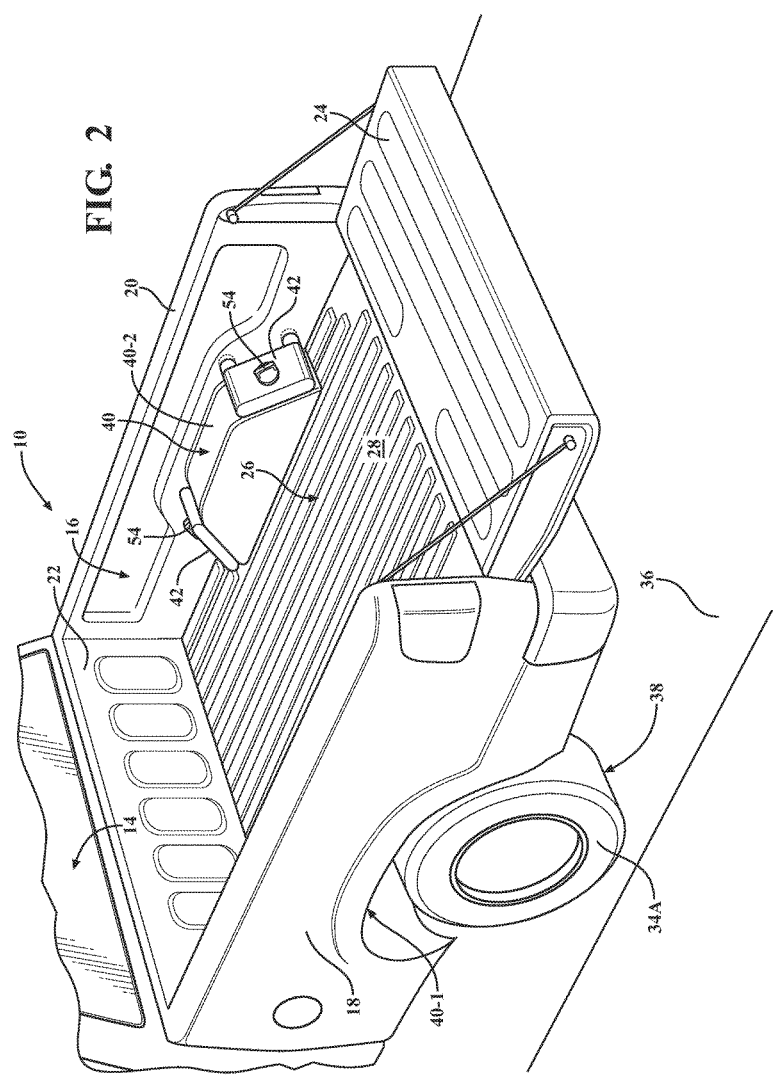

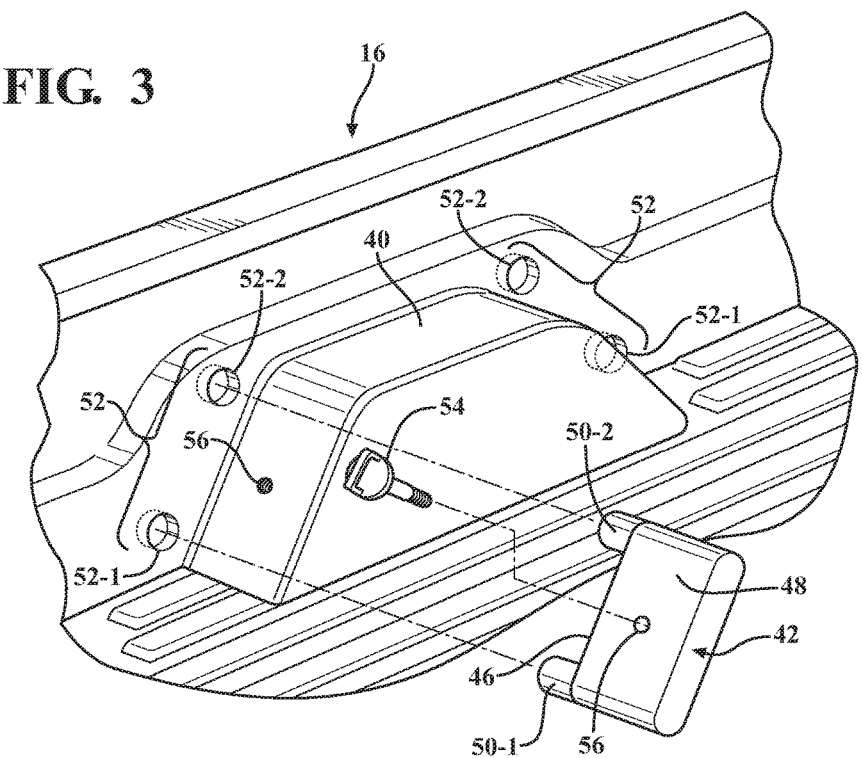
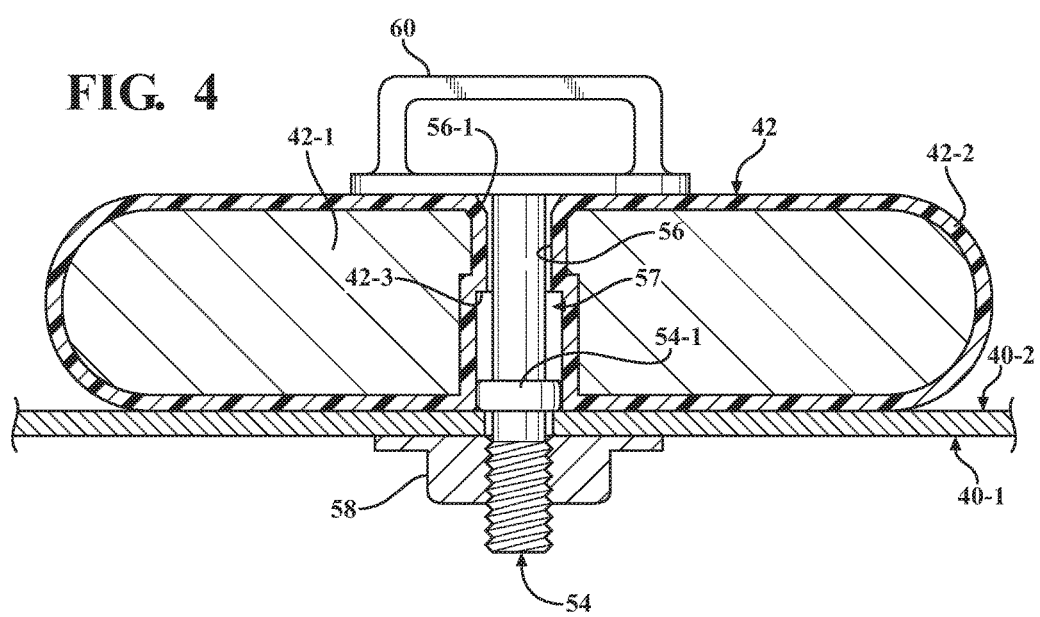

INTEGRATED VEHICLE BODY WEIGHT(S)

TECHNICAL FIELD

The present disclosure is drawn to weight(s) integrated into a motor vehicle body.

BACKGROUND

Motor vehicles can come in a variety of configurations. For example, an automobile is a motor vehicle focused primarily on transporting passengers, while a truck is a motor vehicle specifically designed for transporting cargo, such as materials and equipment. Such vehicles can be front-, rear-, or all-wheel-drive. Traction of the vehicle's drive wheels is significantly influenced by the amount of weight acting thereon. Additionally, drive wheel traction can be reduced on loose surfaces and during inclement weather.

SUMMARY

A vehicle includes a power-source configured to propel the vehicle via power-source torque, a driven wheel configured to receive the power-source torque, and a vehicle body structure. The vehicle body structure includes a wheelhouse configured to extend over the driven wheel and also defines a locating feature. The vehicle further includes an integrated weight element configured to engage the locating feature and a fastener configured to fix the integrated weight element to the vehicle body structure either proximate to or directly to the wheelhouse. Accordingly, the integrated weight element can be fixed directly to the wheelhouse or any side or floor structure of the vehicle.

The vehicle body structure may define a storage compartment, such that the wheelhouse is arranged inside the storage compartment. In such a case, the locating feature can be a plurality of apertures defined by the storage compartment, and the integrated weight element can include a plurality of projections configured to match up to and engage the plurality of apertures.

The integrated weight element can include a first surface and a second surface, wherein the first surface is arranged perpendicular to the second surface. Furthermore, each of the plurality of projections can extend from the first surface along the second surface.

The integrated weight element can define a weight element aperture arranged perpendicular to the second surface and configured to accept the fastener, such that the fastener extends through the aperture to engage the wheelhouse.

The fastener can include a handle configured to be grasped and turned by an operator to selectively install the fastener and thereby fix the integrated weight element to the wheelhouse, and remove the fastener to disengage the integrated weight element from the wheelhouse.

The wheelhouse can include a receptacle configured to be threadably engaged by the fastener.

The wheelhouse can include a surface facing the driven wheel. In such a case, the receptacle can be configured as a weld-nut fixed to the surface of the wheelhouse facing the driven wheel.

The integrated weight element can include a weighted core and an external casing configured to envelop the core. The core can be constructed from metal and the external casing can be constructed from a non-metal material.

The vehicle can be configured as a truck. In such a case, the vehicle body structure can include a truck bed having a side-wall and a floor. Furthermore, the wheelhouse can be formed partially into the side-wall and partially into the floor.

The locating feature can be defined by the side-wall of the truck bed.

Another embodiment of the disclosure is directed to a weight element assembly configured to engage a locating feature on a vehicle body structure. The weight element assembly includes a first surface and a second surface, wherein the first surface is arranged perpendicular to the second surface. The weight element assembly also includes a projection extending from the first surface along the second surface and configured to match up to and engage the locating feature. The weight element assembly additionally includes a fastener configured to fix the integrated weight element to the vehicle body structure. The weight element assembly further includes a weight element aperture arranged perpendicular to the second surface and configured to accept the fastener, and a slidable interlock configured to capture the fastener within the aperture.

The slidable interlock can include a feature on the fastener, such as an increased diameter section or an integral ring on the fastener shaft, configured to be captured by an interconnecting element on the weight element, such as a stepped portion of the weight element aperture.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 2 is a schematic close-up partial rear top perspective view of the vehicle shown in FIG. 1, having a storage compartment that includes integrated, removable weight elements affixed to the vehicle's wheelhouse according to the disclosure.

FIG. 3 is a schematic close-up perspective view of the weight element and a fastener for engaging therewith.

FIG. 4 is a schematic close-up cross-sectional view of the weight element shown in FIGS. 1-3 and the fastener shown engaged therewith, also showing a fastener to weight element slidable interlock and a weld-nut embodiment of a receptacle for affixing the weight element to the wheelhouse according to the disclosure.

DETAILED DESCRIPTION

Figure 1:
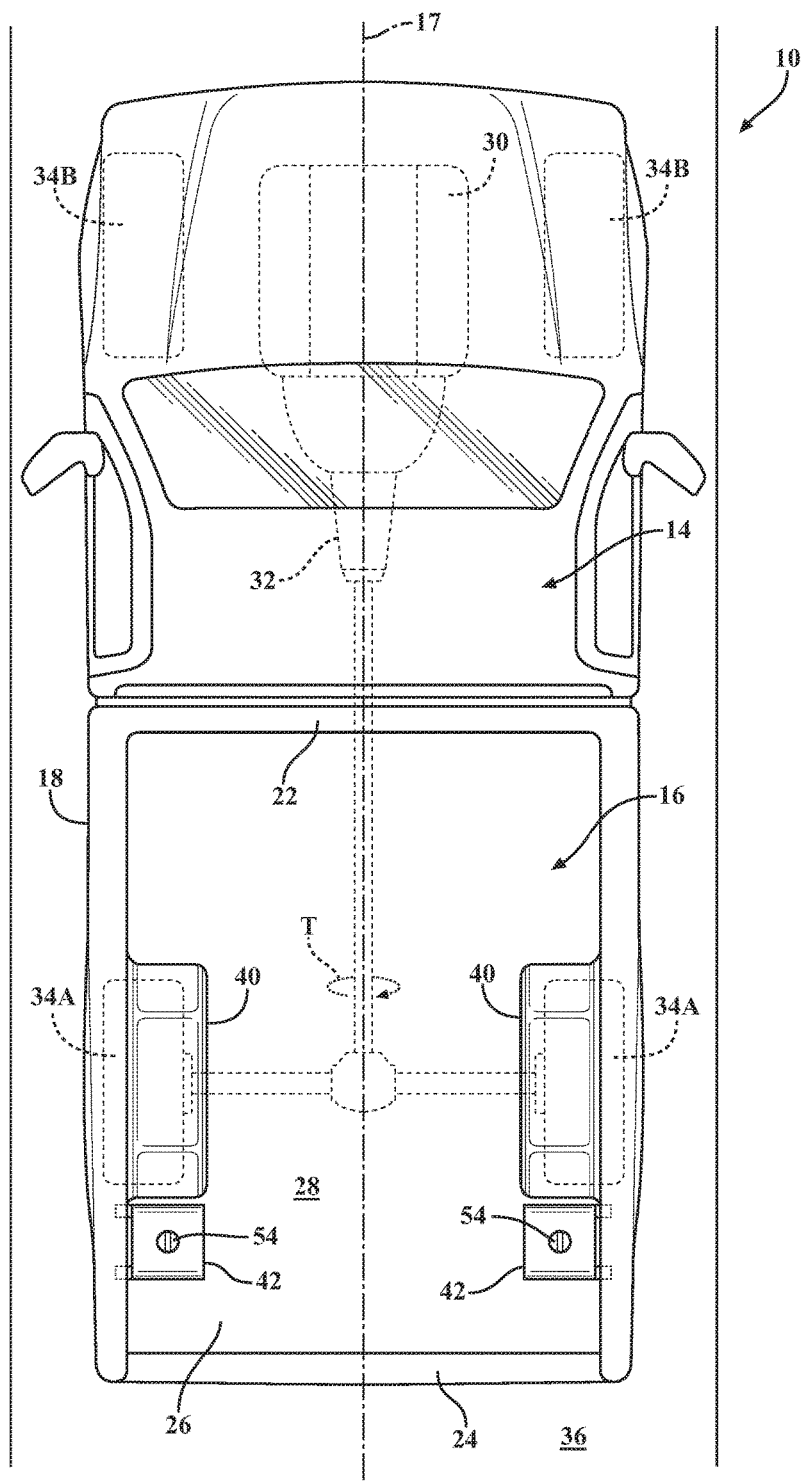
FIG. 1 is a schematic top view of an embodiment of a vehicle having a storage compartment that includes integrated, removable weight elements affixed to the vehicle's body structure according to the disclosure.

Referring to the drawings, wherein like reference numbers refer to like components, FIG. 1 shows a vehicle 10 depicted as a truck. The vehicle 10 includes a vehicle body structure 12. The vehicle body structure 12 defines a passenger compartment 14 and a storage compartment 16. As shown in FIG. 1, the passenger compartment 14 is depicted as a truck cab, while the storage compartment 16 is configured as a truck bed that is generally adapted to carry bulky cargo.

As understood by those skilled in the art, in general, a truck is a motor vehicle designed to transport cargo. Trucks vary greatly in size, power, and configuration, with the smallest being mechanically and dimensionally similar to an automobile. Commercial trucks, on the other hand, can be significantly larger and more powerful than their light truck counterparts, and may be configured to mount specialized equipment, such as in the case of fire trucks and concrete mixers and suction excavators. A truck, such as disclosed in FIG. 1, is typically a light duty truck having an enclosed cab and an open cargo area with low sides and tailgate. Although the vehicle 10 is specifically illustrated and described as a truck, nothing precludes the vehicle 10 from being configured as an automobile, i.e., primarily designed to transport passengers, or any other road-going wheeled vehicle.

A longitudinal axis 17 extends through the passenger compartment 14 and the storage compartment 16. As shown in FIG. 1, the storage compartment 16 is enclosed on four sides. Specifically, the storage compartment 16 includes a plurality of generally vertical perimeter walls, shown as a first or left side-wall 18 and a second or right side-wall 20. The first wall 18 is arranged on one side of the axis 17 and is configured as a left side-wall of the bed, while the second wall 20 is arranged on the other side of the axis, and is therefore configured as a right side-wall. The storage compartment 16 also includes a third side-wall or front wall 22, a fourth side-wall or tail-gate 24, and a floor 26. The left side-wall 18 and the right side-wall 20 are arranged substantially parallel to each other, similar to the arrangement of the front wall 22 relative to the tail-gate 24. The side-walls 18, 20, the front wall 22, and the floor 26 together at least partially define a cargo area 28. As shown in FIG. 1, the tailgate 24 may be pivotably connected to the side-walls 18 and 20 for ease of loading and unloading the cargo area 28.

The vehicle 10 also includes a power-source 30 configured to propel the vehicle via power-source torque T. The power-source 30 can be an internal combustion engine, an electric motor-generator, or a combination thereof acting through a transmission 32 to deliver the power-source torque T to one or more driven wheels 34A. The driven wheels 34A are configured to receive and apply the power-source torque T to a road surface 36 at a frictional interface 38 therewith, as shown in FIG. 2. The storage compartment 16 is arranged over the driven wheels 34A. As shown, the vehicle 10 is rear-wheel-drive, in other words, the driven wheels 34A are arranged under the storage compartment 16. The storage compartment 16 includes a wheelhouse 40 configured to extend over each of the driven wheels 34A. Each wheelhouse 40 includes a surface 40-1 facing the driven wheel 34A, and also includes an opposite surface 40-2 facing the cargo area 28. As can be seen from FIGS. 1 and 2, each wheelhouse 40 is arranged inside the storage compartment 16 such that the wheelhouse extends into the cargo area 28 and permits the respective driven wheels 34A to remain generally within confines of the vehicle body structure 12. As additionally shown, the wheelhouse 40 can be formed partially into one of the side-walls 18, 20 and partially into the floor 26.

In a typical rear-wheel drive truck, when the truck is not laden, a majority of the pickup's weight resides over non-driven wheels 34B that are arranged proximate the power-source 30 and generally ahead of the passenger compartment 14. Accordingly, in the event the road surface 36 at the frictional interface 38 is soft and/or slippery, traction at the driven rear wheels 34A may be reduced. To facilitate enhanced traction in such conditions, the vehicle 10 also includes an integrated, removable weight element 42. Within the meaning of the present disclosure, the term "integrated" generally denotes a weight element having dedicated feature(s) provided to engage specifically configured features of the vehicle body structure 12 to thereby position and fix the weight element in place.

As shown in FIG. 3, the weight element 42 has a first surface 46 and a second surface 48, wherein the first surface 46 is arranged perpendicular to the second surface 48. The weight element 42 can also include a plurality of projections 50-1 and 50-2, wherein each of the projections extends from the first surface 46 along the second surface 48. The weight element 42 can include a weighted core 42-1 and an external protective casing 42-2 configured to envelop and shield the core from external elements. For example, the weighted core 42-1 can be metal, sand, stone, water, etc., while the protective casing 42-2 can be a container type of structure configured to receive the weighted core. The protective casing 42-2 can be constructed from a non-metal material such as plastic to, for example, forestall corrosion of a metal weighted core. The weight element 42 can have any specific weight deemed optimum for the specific vehicle 10, and can also have any particular dimensions for most effective packaging in the cargo area 28 such that the majority of the space therein remains available for carrying cargo items. The vehicle 10 can be provided with a plurality of weight elements 42, such as one or more weight elements per each respective wheelhouse 40.

According to the disclosure, the weight element 42 is configured to engage a locating feature 52 defined by the storage compartment 16. The locating feature 52 can be configured as a plurality of apertures, such as the two apertures 52-1 and 52-2 defined by either the left side-wall 18 or the right side-wall 20 shown in FIG. 3. In such an embodiment, the projections 50-1 and 50-2 of the weight element 42 can be configured to match up to and engage the apertures 52-1 and 52-2, respectively, to thereby position the weight element with respect to the storage compartment 16. As shown in FIGS. 1, 2, and 4, a fastener 54 is employed to fix the weight element 42 to the body structure 12. The weight element 42 defines a weight element aperture 56 arranged perpendicular to the second surface 48.

As shown in FIG. 4, a slidable interlock 57 can be used between the fastener 54 and the weight element 42 to capture the fastener within the aperture 56. As shown, the slidable interlock 57 can include a fastener feature 54-1, such as an increased diameter section or a fixed ring on the shaft of the fastener 54, for being captured by an interconnecting element 42-3, such as a step in the structure of the weight element 42 at the weight element aperture 56. Such a cooperating structure can maintain contact between the fastener 54 and the weight element 42, while providing the fastener with the ability to slide relative to the second surface 48. The weight element aperture 56 may also include a lead-in chamfer 56-1 configured to permit the fastener feature 54-1 to be more effectively aligned with the aperture for assembly with the weight element 42. Accordingly, the embodiment having the slidable interlock 57 would combine the weight element 42 and the fastener 54 into a weight element assembly. Alternatively, the fastener 54 can be a separate component sans the feature 54-1, thus configured to be inserted into the aperture 56 and removed as needed.

The fastener 54 can be configured to fix the weight element 42 directly to the wheelhouse 40. As shown in FIGS. 2 and 3, the weight element aperture 56 is configured to accept the fastener 54 such that the fastener extends through the weight element aperture to engage the wheelhouse 40. Although FIGS. 2 and 3 illustrate the weight element 42 being positioned at and fixed directly to the wheelhouse 40, the weight element can alternatively be configured for being affixed to the vehicle body structure 12 proximate to the wheelhouse, such as to the floor 28 (as shown in FIG. 1), or to any of the walls 18, 20, or 22.

Each wheelhouse 40 can include a receptacle 58 configured to be threadably engaged by the fastener 54. In the embodiment where it is deemed beneficial to provide the vehicle 10 with a plurality of weight elements 42 for each respective wheelhouse 40, each wheelhouse can include a dedicated locating feature 52 and receptacle 58 for each such individual weight element. The receptacle 58 can be configured as a weld-nut (shown in FIG. 4) fixed to the surface 40-1 of the respective wheelhouse 40. The fastener 54 can include a handle 60 configured to be grasped and turned by the operator to selectively install the fastener and thereby fix the weight element 42 to the wheelhouse 40, and remove the fastener to disengage the weight element from the wheelhouse. The handle 60 can also be employed as a tie-down feature, for example to attach a cable to restrain cargo in the storage compartment 16. Overall, the integrated but removable weight element 42 can be selectively employed in the vehicle 10 to enhance traction at the driven rear wheels 34A at the frictional interface 38 under slippery and/or soft road surface 36 conditions.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a driven wheel configured to receive a power-source torque;
   a vehicle body structure including a wheelhouse configured to extend over the driven wheel and defining a locating feature, wherein the vehicle body structure defines a storage compartment, the wheelhouse is arranged inside the storage compartment, and the locating feature is a plurality of apertures defined by the storage compartment;
   an integrated weight element configured to engage the locating feature, wherein the integrated weight element includes a plurality of projections configured to match up to and engage the plurality of apertures, and a first surface and a second surface, wherein the first surface is arranged perpendicular to the second surface, and wherein each of the plurality of projections extends from the first surface along the second surface; and
   a fastener configured to fix the integrated weight element to the vehicle body structure either proximate to or directly to the wheelhouse.

2. The vehicle of claim 1, wherein the integrated weight element defines a weight element aperture arranged perpendicular to the second surface and configured to accept the fastener.

3. The vehicle of claim 1, wherein the fastener includes a handle configured to be grasped and turned to selectively install the fastener and thereby fix the integrated weight element to the wheelhouse, and remove the fastener to disengage the integrated weight element from the wheelhouse.

4. The vehicle of claim 1, wherein the wheelhouse includes a receptacle configured to be threadably engaged by the fastener.

5. The vehicle of claim 1, wherein the integrated weight element includes a weighted core and an external casing configured to envelop the weighted core.

6. The vehicle of claim 1, wherein:
   the vehicle is configured as a truck;
   the vehicle body structure includes a truck bed having a side-wall and a floor, and the wheelhouse is formed into the side-wall and the floor; and
   the locating feature is defined by the side-wall of the truck bed.

7. A truck comprising:
   a power-source configured to propel the vehicle via power-source torque;
   a driven wheel configured to receive the power-source torque;
   a truck bed including a side-wall, a floor, and a wheelhouse configured to extend over the driven wheel and defining a locating feature, wherein the wheelhouse is formed into the side-wall and the floor and the locating feature is defined by the side-wall of the truck bed;
   an integrated weight element configured to engage the locating feature; and
   a fastener configured to fix the integrated weight element to the vehicle body structure either proximate to or directly to the wheelhouse.

8. The truck of claim 7, wherein:
   the vehicle body structure defines a storage compartment;
   the wheelhouse is arranged inside the storage compartment;
   the locating feature is a plurality of apertures defined by the storage compartment; and
   the integrated weight element includes a plurality of projections configured to match up to and engage the plurality of apertures.

9. The truck of claim 8, wherein the integrated weight element includes a first surface and a second surface, wherein the first surface is arranged perpendicular to the second surface, and wherein each of the plurality of projections extends from the first surface along the second surface.

10. The truck of claim 9, wherein the integrated weight element defines a weight element aperture arranged perpendicular to the second surface and configured to accept the fastener.

11. The truck of claim 7, wherein the fastener includes a handle configured to be grasped and turned to selectively install the fastener and thereby fix the integrated weight element to the wheelhouse, and remove the fastener to disengage the integrated weight element from the wheelhouse.

12. The truck of claim 7, wherein the wheelhouse includes a receptacle configured to be threadably engaged by the fastener.

13. The truck of claim 7, wherein the integrated weight element includes a weighted core and an external casing configured to envelop the weighted core.

14. A weight element assembly configured to engage a locating feature on a vehicle body structure, the weight element comprising:

a first surface and a second surface, wherein the first surface is arranged perpendicular to the second surface;

a projection extending from the first surface along the second surface and configured to match up to and engage the locating feature on the vehicle body structure;

a fastener configured to fix the integrated weight element to the vehicle body structure;

a weight element aperture arranged perpendicular to the second surface and configured to accept the fastener; and a slidable interlock configured to capture the fastener within the aperture.

15. The weight element assembly of claim 14, wherein the fastener includes a handle configured to be grasped and turned to selectively install the fastener and thereby fix the integrated weight element to the vehicle body structure, and remove the fastener to disengage the integrated weight element from the vehicle body structure.

16. The weight element assembly of claim 14, wherein the integrated weight element includes a weighted core and an external casing configured to envelop the weighted core.

17. The weight element assembly of claim 14, wherein the slidable interlock includes a feature on the fastener configured to be captured by an interconnecting element on the weight element.

* * * * *